United States Patent [19]

Curtiss, Jr.

[11] 4,030,530
[45] June 21, 1977

[54] SIDEWALL PROTECTOR FOR A TIRE

[75] Inventor: Walter W. Curtiss, Jr., Brimfield, Ohio

[73] Assignee: The Goodyear Tire & Rubber Company, Akron, Ohio

[22] Filed: Jan. 5, 1976

[21] Appl. No.: 647,273

[52] U.S. Cl. .............................. 152/187; 152/179; 152/191; 305/54
[51] Int. Cl.² .......................................... B60C 27/00
[58] Field of Search .......... 152/185, 187, 188, 189, 152/190, 191, 159, 170, 175, 178, 179, 180, 182, 160; 305/19, 51, 54; 301/37 R, 37 ST

[56] References Cited
UNITED STATES PATENTS

| 1,148,957 | 8/1915 | Comer | 152/189 |
| 1,362,475 | 12/1920 | Copp | 152/189 |
| 1,450,800 | 4/1923 | Frazier | 152/159 |
| 3,187,797 | 6/1965 | Fletcher et al. | 152/154 |
| 3,899,220 | 8/1975 | Grawey et al. | 152/182 |

Primary Examiner—Drayton E. Hoffman
Attorney, Agent, or Firm—F. W. Brunner; H. E. Hummer

[57] ABSTRACT

A tire for off-the-road vehicles. The tire is designed for a removable tread, or a lugged, metal traction band. A pair of detachable resilient shields are maintained adjacent the upper sidewalls of the tire to protect this critical area of the tire from punctures.

8 Claims, 1 Drawing Figure

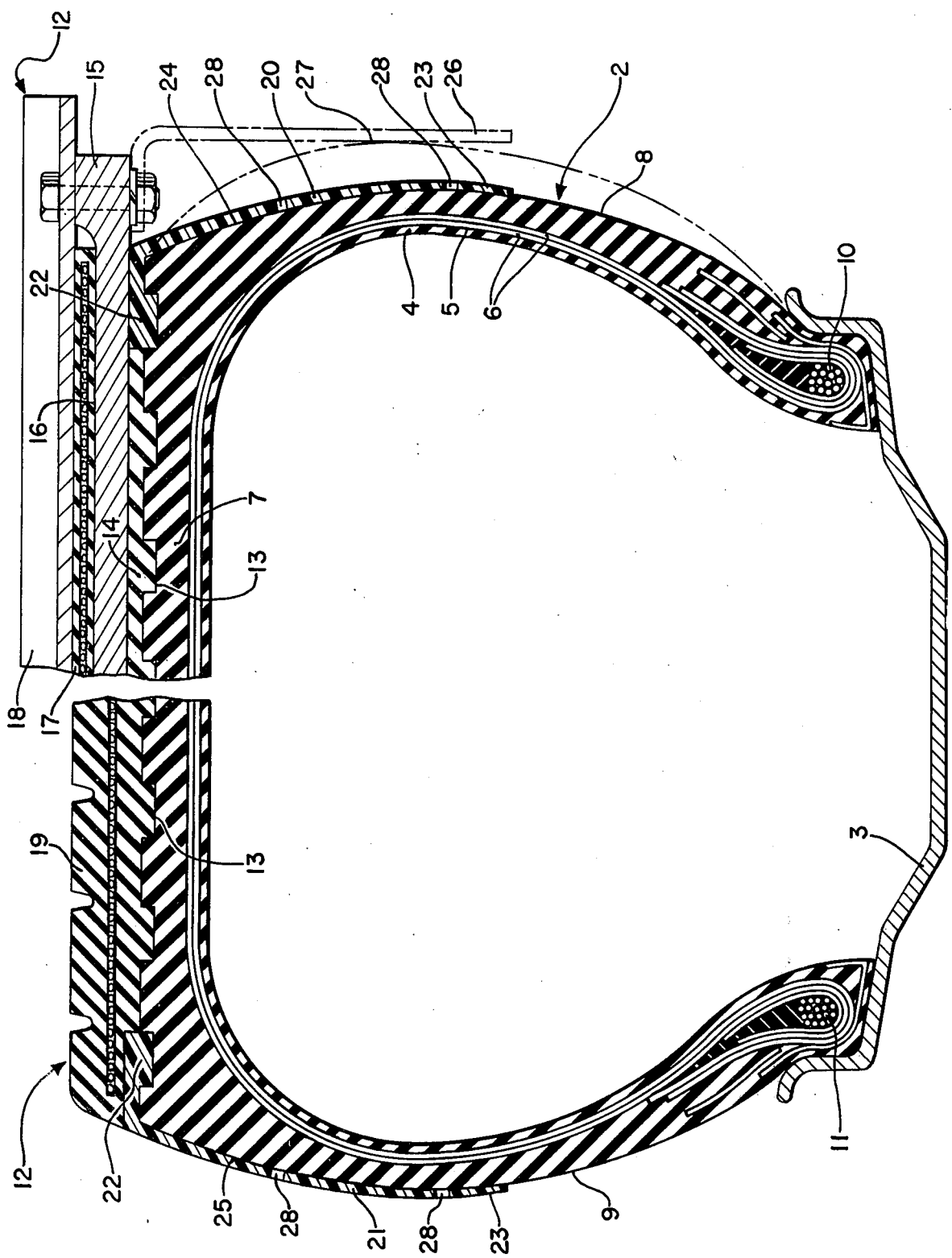

SIDEWALL PROTECTOR FOR A TIRE

BACKGROUND OF THE INVENTION

The invention is particularly well suited for use with tires for trucks, earthmovers, or military vehicles which operate off-the-road, and especially those tires which employ a removable tread, or a detachable traction band with metallic grouser bars as shown and described in U.S. Pat. No. 3,871,720. The sidewalls of such tires are vulnerable to punctures from sharply pointed rocks and pieces of metal, and other jagged material which the tire is likely to encounter as it rolls over the rough terrain on which off-the-road type vehicles are designed to operate. Passenger tires of the early nineteen hundreds were also highly susceptible to punctures. Consequently, there has been a continuing effort to find some way of protecting the protruding, flexed sidewalls of a tire without detracting from the design characteristics of the tire.

Curved, metal protector plates, as shown and described in U.S. Pat. No. 1,266,403, have been used with little success to shield the vulnerable sidewalls of the tire. Non-metallic shields, such as those shown and described in U.S. Pat. Nos. 820,296 and 1,450,800, were also used to protect the sidewalls. The 1,450,800 patent is especially interesting because it discloses the use of rubber sidewall stock only in the upper sidewall areas of the tire, rather than extending the sidewall rubber completely around the entire tire carcass into the bead areas of the tire. In both cases, the protecting shields adversely affect the operational characteristics of the tire, since the shields are permanently adhered to the tire and will, therefore, experience the tension and bending stresses of the tire, which stresses act to enlarge cuts or snags that occur in the sidewalls of the tire. The invention is directed to a simple, economical method of protecting the sidewalls without interfering with the design characteristics of the tire.

Briefly stated, the invention is in the provision of resilient, annular shields for protecting the sidewalls of a tire. The shields are each composed of a suitable resilient material, e.g. rubber, and are positioned for absorbing the cuts and bruises normally inflicted on the sidewalls of the tire. The annular shields are attached to the tire such that portions of the shields covering the sidewalls are free of the sidewalls so that the stresses experienced by the sidewalls as they flex during operation of the tire, will not be imparted to the shields.

Thus, unlike a cut in the sidewall of the tire, a cut in a shield will not grow or become enlarged during flexing or deflection of the tire. The shields are demountable from the tire such that a highly abused and worn shield may be removed and replaced with a new shield to prolong the life of the tire.

DESCRIPTION OF THE DRAWING

The following description of the invention will be better understood by having reference to the annexed drawing which is a section of a tire and wheel rim, showing two different embodiments of a replaceable traction element with a shield for protecting one or both of the sidewalls of the tire.

ENVIRONMENT OF THE INVENTION

With reference to the drawing, there is shown a tire 2 and conventional drop center rim 3 on which the tire 2 is mounted. The tire 2 is a large off-the-road type tire which may be of the closed torus or oval design typified in U.S. Pats. Nos. 1,921,722; 3,318,357; 3,392,072; 3,523,566 and Brit. Pat. No. 1,047,921. The tire 2 essentially comprises a fluid impervious innerliner 4 which is surrounded by a carcass 5 that is composed of an appropriate number of individual plies of rubberized reinforcement cords 6, depending on the size of the tire 2. An undertread 7 and pair of sidewalls 8,9 cover the tire carcass 5 and terminate at a pair of inextensible, annular metal beads 10,11. A traction element 12 is removably mounted around the outer periphery 13 of the tire 2. The traction element 12, as seen in the right side of the drawing, comprises a continuous, rubber tread band 14 surrounded by an articulated metal ring 15 which is provided with a circumferential recess 16 for receiving a rubber belt 17. A number of metallic grouser bars 18 are bolted to the metal ring 15. An alternate traction element 12, as seen in the left side of the drawing, is a removable tread 19, similar to those of U. S. Pat. No. 3,344,006, which is detachably mounted around the outer periphery 13 of the tire 2 Thus, the invention is designed to be used with either component of a removable tread or tread band with attached grouser bars.

THE INVENTION

A pair of annular, resilient shields 20,21 are attached to the tire 2 adjacent the removable traction element 12. In this case, a generally cylindrical portion 22 of each of the shields 20,21 is interposed between the removable traction element 12 and the outer peripheral surface 13 of the tire 2. A number of circumferentially oriented, matingly configured ribs and grooves are formed in the adjoining surfaces of the tire 2, traction element 12 and shields 20,21 to provide a mechanical innerlock between these components. The exposed, outer free ends 23 of each of the shields 20,21 extend downwardly from the removable traction assembly 12 in the direction of the annular beads 10,11. The shields 20,21 are composed of any suitable resilient, elastic material, e.g. natural or synthetic rubber, or plastic such as urethane, and may be reinforced with appropriate textile cords or wires, depending on the cut resistance desired. It is desirable to produce the shields 20,21 from material which will not abrade the rubber material of the tire adjacent the shields 20,21.

The free ends 23 of the resilient shields 20,21 are configured to cover at least the upper sidewalls 24,25 of the tire 2 and, preferably, extend over the most laterally flexed or deflected portions of the sidewalls 8,9 (see dotted position of flexed sidewall 8) when the tire 2 is in operation on the vehicle for which the tire 2 is designed. The shields 20,21 are not secured to the upper sidewalls 24,25 by vulcanization, rubber cement, or any other adhesive, but are maintained separate from them such that any stresses experienced by the upper sidewalls 24,25 during flexing of the tire 2 will not be imparted to the shields 20,21. With reference to the embodiment of the traction element 12 shown in the right side of the drawing, a shield 26, shown in dotted line, is bolted to the metal ring 15 and used as an alternate to the shield 20, or in combination with the shield 20 as additional protection for the adjacent sidewall. The shield 26 is free of the upper sidewall 24 and is designed to compressively engage the outermost flexed portion 27 of the sidewall 8 which the shield 26 at least partially covers, to prevent dirt and other debris from getting between the shield 26 and sidewall 8.

Thus, the shields 20,21,26 should be contoured to contact at least the outermost flexed portions of the sidewalls 8,9 during operation of the tire 2 and not become separated from the tire 2, as do the splash guards typified in U.S. Pat. No. 3,187,797. The shields 20,21,26 may be provided with a number of small perforations or openings 28 for allowing the dissipation of heat through the shields into the ambient atmosphere.

As previously indicated, it is essential for the shields 20,21,26 to be separate from the portions of the sidewalls 8,9 covered by the shields 20,21,26 and not cemented or vulcanized to the sidewalls 8,9 of the tire 2, as are the ornamental sidewalls typified in U.S. Pat. No. 2,334,388. A severely worn and damaged shield can be easily removed and replaced with a new one, especially when the removable traction element 12 is worn sufficiently to be replaced. The shields 20,21,26 are preferably a continuous annulus, although they can be composed of a number of arcuate segments which can be overlapped or abutted.

Thus, there has been provided a detachable, non-rigid or semi-rigid shield which is positioned adjacent the sidewalls of a tire for absorbing cuts and bruises normally inflicted on the tire. The shield is a separate piece of elastomeric material in addition to the normal rubber sidewall stock of the tire. A single shield can be used in cases where it is desired to protect only one of the sidewalls of the tire. It is most desirable to attach the shield to the tire adjacent the tread of the tire, rather than at the bead area of the tire, because the tire is more susceptible to cuts and bruises in the upper and not lower sidewall areas of the tire. In some cases, however, the resilient shield may be designed for attachment to the wheel rim, but in such cases the shield should extend upwardly over the upper sidewalls of the tire and be shaped so that it will not leave the upper sidewalls as do the rain deflectors of U. S. Pat. No. 3,187,797, when the tire is in operation.

What is claimed is:

1. In a tire comprising components of a tire carcass including at least one layer of reinforcement cords, a traction element and a pair of sidewalls which at least partially surround the carcass, the improvement comprising a non-rigid shield for covering and protecting at least one of the upper sidewall portions of the tire against punctures, the shield being separate from the portion of the sidewall which the shield covers such that stresses experienced by the sidewall during flexing will not be imparted to the shield, the shield being configured to at least engage the most deflected portion of the sidewall during flexing thereof, the shield being composed of elastomeric material which is sufficiently resilient to absorb cuts inflicted by sharp objects such as rocks, the shield being generally L-shaped, in section, and comprising, (I) an annulus for at least covering the adjacent upper sidewall portion, (II) a cylindrical portion which is secured between the two components of traction element and tire carcass, and (III) means carried by the cylindrical portion for forming a mechanical interlock with at least one of said two components of the tire.

2. The improvement of claim 1, wherein the traction element includes metal grouser bars carried by the tire at the outer periphery thereof.

3. The improvement of claim 1, wherein the tire includes at least one pair of parallel, inextensible, annular beads carried by the tire in opposite relation from the traction element of the tire.

4. The improvement of claim 1, wherein the shield is composed of resilient material of the group of natural and synthetic rubbers and plastic.

5. The improvement of claim 1, wherein the traction element is a tread of the removable type.

6. The improvement of claim 1, wherein the means for forming a mechanical interlock with at least one of said two components includes at least one circumferential rib projecting from the cylindrical portion and a matingly configured groove circumferentially formed in one of said two components for receiving said rib.

7. The improvement of claim 1, wherein a shield protects each of the sidewalls of the tire.

8. The improvement of claim 1, wherein the annulus of the shield covers the complete sidewall of the tire.

* * * * *